United States Patent [19]

Resch

[11] Patent Number: 4,964,676
[45] Date of Patent: Oct. 23, 1990

[54] BRAKE UNIT

[75] Inventor: Reinhard Resch, Stuttgart, Fed. Rep. of Germany

[73] Assignee: Daimler-Benz Aktiengesellschaft, Fed. Rep. of Germany

[21] Appl. No.: 371,843

[22] Filed: Jun. 27, 1989

[30] Foreign Application Priority Data

Jun. 28, 1988 [DE] Fed. Rep. of Germany ....... 3821730

[51] Int. Cl.$^5$ .......................... B60T 8/26; B60T 8/32; B60T 13/12; B60T 8/44
[52] U.S. Cl. ..................................... 303/52; 188/358; 303/92; 303/114; 303/119
[58] Field of Search .................................. 303/50–56, 303/10, 114, 119, 92; 188/358, 359; 60/547.1, 582, 580, 581, 550, 548

[56] References Cited

U.S. PATENT DOCUMENTS

| | | | |
|---|---|---|---|
| 4,027,922 | 6/1977 | Schlicker | 303/52 X |
| 4,189,191 | 2/1980 | Margetts et al. | 303/52 |
| 4,200,340 | 4/1980 | Margetts | 303/52 X |
| 4,251,114 | 2/1981 | Belart | 303/52 X |
| 4,260,197 | 4/1981 | Hawker | 303/52 |
| 4,357,055 | 11/1982 | Leiber et al. | 303/52 |
| 4,443,040 | 4/1984 | Farr | 303/50 |
| 4,563,043 | 1/1986 | Scheuerihg | 303/52 |
| 4,778,224 | 10/1988 | Leiber | 303/52 X |
| 4,783,128 | 11/1988 | Resch | 303/114 |
| 4,850,655 | 7/1989 | Takata et al. | 188/358 X |

FOREIGN PATENT DOCUMENTS

| | | |
|---|---|---|
| 0183997 | 6/1986 | European Pat. Off. . |
| 3444829 | 6/1986 | Fed. Rep. of Germany . |
| 3632507 | 9/1987 | Fed. Rep. of Germany . |
| 3700697 | 7/1988 | Fed. Rep. of Germany . |
| 3700698 | 7/1988 | Fed. Rep. of Germany . |
| 2142398 | 1/1985 | United Kingdom . |

*Primary Examiner*—Douglas C. Butler

[57] ABSTRACT

A fail safe control for a brake unit with an integral hydraulic brake booster for a road vehicle with a hydraulic dual-circuit braking system having a static front-axle brake circuit and a static rear-axle brake circuit connected respectively to primary and a secondary outlet-pressure space. The primary outlet-pressure space is delimited, by a piston element of the primary-piston arrangement and is in constant communicating connection with a second part space which is delimited by a secondary piston and by two piston elements which are displaceable relative to one another. One of these two piston elements is designed as an annular piston and the second as a plunger piston. A yoke-shaped first axial-force transmission element couples the primary piston with only one of the two piston elements. There is also a second axial-force transmission element coupling the other piston element with the drive piston and a third axial-force transmission element, via which a pedal force acts on the yoke-shaped axial-force transmission element upon failure of the brake booster.

20 Claims, 5 Drawing Sheets

BRAKE UNIT

BACKGROUND AND SUMMARY OF THE INVENTION

The invention relates to a brake unit for a road vehicle with a hydraulic dual-circuit braking system comprising a static front-axle brake circuit and a static rear-axle brake circuit which are connected respectively to a primary outlet-pressure space and a secondary outlet-pressure space of the brake unit. Brake pressure can be built up in these spaces under the control of an actuating force $K_P$, set a a value correlated with the actuating force with which the driver actuates a brake pedal. The brake unit includes a hydraulic brake booster comprising a brake valve generating an outlet pressure which is proportional to the pedal force $K_P$ and which can be fed into at least one drive pressure space which is limited in an axially movable manner by a drive piston of the brake booster. The displacement of the piston occurs as a result of being subjected to pressure determined by the brake valve and this displacement can be transmitted, via at least one axial-force transmission element, to piston elements of a primary-piston arrangement forming one movable side of the primary outlet-pressure space. By this arrangement the primary-piston directly experiences the movement of the drive piston and a second piston limiting a secondary outlet-pressure space is moved indirectly as a result of the pressure build-up in the primary outlet-pressure space and into a position linked to the expected brake-force value. The brake system includes a housing possessing two housing bores, parallel to one another, in one of which the secondary piston is arranged in a displaceably pressure-tight manner and in the other of which, at least one piston element of the primary-piston arrangement is guided displaceably in a pressure tight manner. The effective cross-sectional surface of the said piston element defines a corresponding part cross-section of the primary outlet-pressure space. The primary-piston arrangement comprises a piston element which, in the event of a failure of the brake booster, remains in a basic position corresponding to the non-actuated state of the brake unit and which is motionally coupled to the brake pedal positively and non-positively and, in the event of a failure of the front-axle brake circuit, can be supported axially on a piston element, as a result of the axial displacement of which, brake pressure can be built-up in the secondary outlet pressure space.

A brake unit of this general type is known from German Patent Specification No. 3,632,507. This known brake unit is intended for a braking system with a static front-axle brake circuit and a static rear-axle brake circuit which are connected respectively to a primary outlet-pressure space and a secondary outlet-pressure space of the brake unit. Brake pressure can be built up in these outlet-pressure spaces under the control of the actuating force $K_P$ with which the driver actuates a brake pedal. Integrated in this brake unit is a hydraulic brake booster comprising a brake valve supplying an outlet pressure which is proportional to the force K, with which the driver actuates the brake pedal, and which is derived from an auxiliary pressure source. This outlet pressure, proportional to the pedal force, can be fed into a drive pressure space limited movably by a drive piston which is designed as an annular piston and which, as a result of the drive pressure space being subjected to pressure, experiences a displacement which takes place via a flange-shaped axial-force transmission element of a plunger piston passing axially through the annular piston. The plunger piston is sealed off and displaceable relative to the annular piston and forms, together with the annular piston, the primary-piston arrangement which forms the limitation, movable on one side, of the primary outlet-pressure space, to which the front-axle brake circuit is connected. The pressure build-up occurring in the primary outlet-pressure space causes the indirect displacement of the floating piston, delimiting the primary outlet-pressure space relative to a control-pressure space, in which a pressure corresponding to the pressure in the primary outlet-pressure space is built up as a result of the displacement of the floating piston. These pistons and pressure spaces are arranged along a common central longitudinal axis, along with a guided displaceable push rod, via which, in the event of a failure of the brake booster, the pedal force can be transmitted to the central plunger piston of the primary-piston arrangement. The effective cross-sectional surface of the plunger piston is smaller than that of the annular piston. The pressure which can be built up in the control-pressure space is fed, via a transverse channel in the housing of the known brake unit, into a second control-pressure space, limited fixedly relative to the housing by a housing bore, the central longitudinal axis of which extends parallel to the central longitudinal axis along which the above-mentioned pistons and pressure spaces are arranged. This second control-pressure space is limited, movably on one side, by a drive piston which itself engages on a tappet-shaped extension of the secondary piston, forming the movable limitation of the secondary outlet-pressure space to which the rear-axle brake circuit is connected. This "bent" design of the brake unit, with primary and secondary outlet-pressure spaces connected hydraulically in series, is chosen in order to make it possible to obtain a design arrangement having a short dimension in the axial direction.

The two-part construction of the primary-piston arrangement ensures that, in the event of a failure of the brake booster, a "ratio jump" occurs, so that, if the brake booster fails, that is to say when only the pedal force is available for actuating the brakes, a so-called "ratio jump" takes place. Hence, with a lengthened pedal travel, a relatively higher brake pressure can be built up. Furthermore, the floating piston, delimiting the primary outlet-pressure space relative to the first control-pressure space, is so designed that upon a failure of both the brake booster and the front-axle brake circuit, the plunger piston can come to bear on an axial extension of the floating piston, and therefore the floating piston is displaceable as a result of pedal force. Thus a brake pressure can thereby be built up in the rear-axle brake circuit, and because the floating piston has an effective cross-sectional surface smaller than the total cross-sectional surface of the primary-piston arrangement, a "pressure jump" takes effect, in such a way that the brake pressure, which can be built up in the rear-axle brake circuit during the particular malfunction mentioned, is relatively higher than in circumstances free of any malfunction.

Nevertheless, the known brake unit has the disadvantage, which must be considered serious from the point of view of safety, that when a leak occurs between the control-pressure spaces connected to one another by means of the transverse bore, it is no longer possible to actuate the rear-axle brake circuit. The same disadvantage occurs when the control-pressure spaces, connected to one another by means of the traverse channel, are poorly ventilated. In the design characteristic of the known brake unit, there is also fundamentally no possibility that the piston, movably limiting the secondary outlet-pressure space, can be actuated "mechanically" via the brake pedal, as a final possible emergency measure. The known brake unit is therefore less functionally reliable than a conventional tandem master cylinder, the disadvantage of which is to be seen in the fact that it requires a relatively large axial constructional length, which is often not available in the confined installation space.

The object of the invention is, therefore, to improve a brake unit of the type mentioned in the introduction, to the effect that, while having an axial constructional length reduced in comparison with a conventional tandem master cylinder, in emergency situations of a malfunction of the brake booster and/or a failure of the front-axle brake circuit, it offers the same degree of safety in terms of the brake forces or vehicle decelerations still obtainable under those circumstances as a conventional tandem master cylinder, yet is of simple construction and can be produced cost-effectively.

According to the invention, this object can be achieved by having the primary outlet-pressure space comprise a first part space which is movably limited on one side by a first piston element of the primary-piston arrangement and which is otherwise fixed in a first axial bore of the housing. A second part space is provided which is in constant communicating connection with the first part space and which is movably axially limited on both sides, within the second housing bore by the secondary piston on one side and on the other side by two piston elements of the primary-piston arrangement which are displaceable relative to one another in a pressure-tight manner. One of these two piston elements is designed as an annular piston, sealed off displaceably relative to the housing bore, and the second, piston is designed as a plunger piston which is arranged displaceably in a pressure-tight manner in an axial passage bore of the annular piston. A first yoke-shaped axial-force transmission element is provided to make a positive and non-positive motional coupling of the primary piston, limiting the first part space of the primary outlet-pressure space, with only one of the two piston elements which limit the second part space of the primary outlet-pressure space. A second axial-force transmission element is provided to make a positive and non positive motional coupling of the other piston element of the primary-piston elements, limiting the second part space, with the drive piston of the brake booster. A third axial-force transmission element is provided and via which, the actuating force, exertable by means of the brake pedal acts directly on the yoke-shaped axial-force transmission element in the event of a failure of the brake booster.

According to this, the primary outlet-pressure space comprises a first part space which is movably limited on one side by a piston element of the primary piston arrangement and otherwise fixed relative to the housing by the first axial bore of the housing. Furthermore, the primary outlet-pressure space comprises a second part space which is in constant communicating connection with the first part space and which is movably axially limited on both sides within the second housing bore. These axial limitations are formed, on the one hand, by the secondary piston and, on the other hand, by two piston elements of the primary-piston arrangement which are displaceable relative to one another in a pressure-tight manner. The primary piston arrangement has one piston designed as an annular piston, sealed off displaceably relative to the housing bore, and another second piston, designed as a plunger piston which is arranged displaceably in a pressure-tight manner in an axial passage bore of the annular piston. There is a first yoke-shaped axial-force transmission element which makes a positive and non-positive motional coupling of the primary piston, limiting the first part space of the primary outlet-pressure space, with only one of the two piston elements which movably limits the second part space of the primary outlet-pressure space on one side. Furthermore, there is a second axial-force transmission element, which makes a positive and non-positive motional coupling of the other piston element, or of the primary-piston elements limiting the second part space, with the drive piston of the brake booster. Finally there is a third axial-force transmission element, via which the actuating force, exertable by means of the brake pedal, acts directly on the yoke-shaped axial-force transmission element in the event of a failure of the brake booster. This design of the brake unit according to the invention guarantees that, in the event of a simultaneous failure of the brake booster and the front-axle brake circuit, the secondary piston limiting the secondary outlet-pressure space of the brake unit, to which the rear-axle brake circuit is connected, remains displaceable mechanically coupled to the brake pedal, and therefore the vehicle remains brakeable even in extreme emergency. In comparison with the known brake unit, this advantage is afforded without restriction of the requirement for as short an axial constructional length as possible. In constructive terms, the brake unit according to the invention involves a lower technical outlay than the known brake unit.

By means of a second drive piston, arranged coaxially relative to that piston element movably limiting the first space of the primary outlet-pressure space and which can be supported on the yoke-shaped axial-force transmission element, it is possible to achieve the higher boosting effect and, if appropriate, also the utilization of an auxiliary pressure source working at a lower outlet-pressure level. This is advantageous from the point of view of a reduction in wear and the functional reliability of the brake unit.

By a constructionally especially advantageous arrangement of the brake valve within this further drive piston, a push-rod-shaped control member of the brake valve, supported on the drive piston, can be utilized to introduce the actuating force, in the event of a failure of the brake booster, which actuating force is still available for actuating the brakes.

Depending on the design location of the booster pistons and of the brake-unit master-cylinder pistons, transverse forces occurring in the event of a failure of the brake booster or, in circumstances free of any malfunction and engaging especially on the yoke-shaped axial-force transmission element, which is exposed to asymmetric reaction forces at least in the event of a failure of the booster, can be absorbed sufficiently reliably in a simple way by means of an axial guide device. This is obtained by means of piston-like guide extensions, in mutually aligned guide bores of the brake-uint housing.

The design of the brake-unit housing wherein a block-shaped main cylindrical part and a likewise block-shaped booster part are formed at parting line which runs within a leakage-oil space in communicating connection with the outside atmosphere, provides a location for the yoke-shaped axial-force transmission element to be displaceable between positions corresponding to the non-actuated state of the brake unit and to the actuating state linked to the maximum brake force. This ensures a reliable media separation between the brake-unit outlet-pressure spaces, containing the brake fluid, and the brake-unit pressure spaces assigned to the booster part. This avoids the danger that quantities of hydraulic oil, by means of which the brake booster is operated, albeit even if only small quantities, can come in contact with the gaskets, by means of which the outlet-pressure spaces of a brake unit are sealed off from the leakage-oil space. In the brake unit according to the invention, therefore, it is possible to use the conventional gaskets which are resistant to only one hydraulic medium, namely brake fluid or hydraulic oil, and which are substantially cheaper than gaskets resistant to both media.

On the assumption of a uniform—good or bad degree of ventilation of the two brake circuits and fault-free functioning of the brake booster—the invention adheres to the dimensional relationship, that the ratio $F_4/F_5$ of the cross-sectional surface $F_4$ of the primary piston, movably limiting the first part space of the primary outlet-pressure space to the total cross-sectional surface $F_5$ of the primary-piston elements movably limiting as a whole the second part space of the primary outlet-pressure space, is equal to the ratio $F_2/F_3$ of the surfaces $F_2$ and $F_3$ of those drive pistons, which are supported axially on the respective primary piston or primary pistons via the axial-force transmission element. This provides for an effective cross-sectional surfaces of the primary pistons and of the drive pistons of the brake unit, which are arranged respectively coaxially with the primar pistons and thus ensures a perfect compensation of the drive and reaction forces engaging on the yoke-shaped axial-force transmission element, so that no transverse forces can act on the system.

This is true of the symmetrical design of the brake unit wherein, two housing bores are made in a block-shaped master-cylinder part in a symmetric arrangement relative to the central longitudinal axis of that part space of the primary outlet-pressure space limited only by one primary piston. Within these housing bores are two secondary outlet-pressure part spaces and two primary outlet-pressure part spaces, provided in a tandem arrangement. These bores house a floating piston and a primary-piston element in the form of an annular piston and a plunger piston. The secondary outlet-pressure part spaces are in communicating connection with one another and the two part spaces of the primary outlet-pressure space are connected to the part space limited by the centrally arranged piston. The axial actuating force controllable or exertable via the push rod, motionally coupled with the brake pedal, acts centrally, via the symmetrically designed yoke-shaped axial-force transmission element, on the primary piston limiting the central part space and, via radial supporting arms of the yoke on one of the two symmetrically arranged primary-piston elements.

In the design of the brake unit, the actuating force, controllable (or in the event of a failure of the brake boost, exertable) by means of the brake pedal, operates along the common central longitudinal axis of the housing, between the central longitudinal axes of the housing bores and parallel to these. Guide extensions of the yoke-shaped axial-force transmission element also are provided in these housing bores. Thus even with an asymmetric arrangement of the pistons, limiting the outlet-pressure spaces of the brake unit, a marked reduction of the transverse forces taking effect on the yoke-shaped axial-force transmission element in the event of a failure of the booster is achieved.

Both in combination with this design and in combination with a symmetrical design of the brake unit, it is possible and advantageous to provide a third drive piston which is arranged coaxial relative to the central axis, marking the direction of engagement of the actuating force exertable by the brake pedal, and which contains the brake valve of the brake booster and engages on the yoke shaped axial-force transmission element via the booster-facing guide extension of the latter. This arrangement can be utilized to increase the boosting effect or to lower the outlet-pressure level of the auxiliary pressure source of the brake booster. Alternatively the yoke-shaped axial-force transmission element can engage the plunger piston of the primary-piston arrangement via a radial supporting arm for limiting the second or third part space of the primary outlet-pressure space of the brake unit on one side. The plunger piston is connected fixedly in terms of displacement to the yoke-shaped axial-force transmission element and the annular piston can be supported directly on the drive piston of the brake booster via tappet-shaped axial-force transmission elements extending laterally past the supporting arm. Alternatively the yoke-shaped axial-force transmission element could engage on the annular piston of the primary-piston arrangement, limiting the second and/or third part space of the primary outlet-pressure space of the brake unit, via a radial supporting arm. There the plunger piston of this primary-piston arrangement is motionally and fixedly coupled in terms of displacement to the drive piston by passing axially through a bore of the supporting are of the yoke-shaped axial-force transmission element. The designs of the yoke-shaped axial-force transmission element offer possibilities for supporting it respectively on one of the two primary-piston elements, which jointly limit on one side, a part space of the primary outlet pressure space of the brake unit. Each of these two alternative designs of the brake unit ensures that in the event of a failure of both the brake booster and the front-axle brake circuit, a so-called pressure jump takes effect on the rear-axle brake circuit by pedal force. For an acceptable lengthening of the pedal travel, this pressure jump makes it possible to build up a relatively higher brake pressure in the rear-axle brake circuit in comparison with brake unit without a device of this type.

By having, in the basic position of the pistons and axial-force transmission elements of the brake unit (corresponding to the non-actuated state of the latter), a free end of the plunger piston located on the same side as the pressure space (by means of which the latter can be supported on the secondary piston in the event of a joint failure of the brake booster and of the front-axle brake circuit) arranged at a greater axial distance from that piston flange of the secondary piston facing the primary outlet-pressure space than an end extension of the annular piston pointing towards the said secondary piston, a shorter construction is possible. Alternatively by having, in the basic position of the pistons and axial-force transmission element of the brake unit (corresponding to the non-actuated state of the latter), the free end of the plunger piston, located on the same side as the pressure space (and by means of which the latter can be supported in on the secondary piston in the event of a failure of the front-axle brake circuit) arranged at a smaller axial distance from the secondary piston than an end extension or the annular piston (which points towards the said secondary piston and by means of which the latter can be supported on the secondary piston) also provides for an ideal construction in the event of a failure of the brake booster.

These two alternative designs of the brake unit (having the primary-piston element in the form of a plunger piston and of an annular piston) avoid, in the event of a failure of the brake booster in the partial braking range, a differing pressure generation in the front-axle brake circuit and in the rear-axle brake circuit. A differing pressure generation in the front-axle brake circuit and in the rear-axle brake circuit can occur only when the primary-piston element, "taken up" by the yoke-shaped transmission element, runs onto the secondary piston of the brake unit. The substantial avoidance of a pressure spread obtainable in this way is important in an emergency to prevent over-braking of the rear axle in the partial braking range. The advantage is that the vehicle is guaranteed good dynamic stability during emergency braking. On the other hand, if the front-axle brake circuit fails, this dimensioning of the primary pistons means that that piston located at a smaller distance from the secondary piston runs onto the secondary piston correspondingly "earlier", and this is also beneficial to the practical need for as early a start as possible of the braking effect on the rear axle. In this emergency situation, the brake unit according to the invention works in the same way as a conventional tandem master cylinder.

The installed brake-force distribution can be set to two different set values by means of a change-over device by means of which the brake unit can be changed over from a first value of a front-axle/rear-axle brake-force distribution, selected to ensure as high a dynamic stability of the vehicle as possible during a braking operation, to a second value of the front-axle/rear-axle brake-force distribution, at which the rear-axle brake force fraction is higher.

Inasmuch as this is intended to ensure a matching of the brake-force distribution to predetermined load states of the vehicle for the purpose of ensuring the best possible braking effect, a displacement switch which operates as a function of the load can be provided in order that the change-over takes place automatically according to need.

Should the vehicle be equipped with an anti-lock system of conventional design and functioning, criteria and technical measures suitable for the change-over and for carrying it out can be obtained by having the brake unit equipped with an anti-lock system, characterized in that the distribution is changed over to the value of the installed brake-force distribution, corresponding to the higher rear-axle brake-force fraction, when the brake pedal is adjusted and, when the anti-lock control responds, having it changed back to the brake-force distribution value corresponding to a higher dynamic stability. Additionally in the event of the failure of the anti-lock system, the change-over device can change back to the value of the front-axle/rear-axle brake-force distribution corresponding to a higher dynamic stability.

A design of a change-over device of this type which is simple in terms of construction and control is provided by having the housing bore of the housing in which the secondary piston and the annular piston of the primary-piston arrangement are guided displaceably in a pressure-tight manner in a tandem arrangement, possess between a first bore portion, forming the radial limitation, of the secondary outlet-pressure space and a second bore portion forming the limitation, of that part space of the primary outlet-pressure space arranged coaxially relative to the secondary outlet-pressure space, a middle portion, the diameter d of which is smaller than the diameter D of the first bore portion and also smaller than the diameter of the second bore portion receiving the primary-piston arrangement. Here the secondary piston is equipped with two flanges, guided displaceably in a pressure-tight manner in the middle bore position to ensure the pressure-tight delimination of the primary outlet-pressure space relative to the middle bore portion. These flanges define an annular piston flange space extending between them. A brake-force distribution solenoid control valve, in the basic position, shuts off the annular space from the primary outlet-pressure space and relieves pressure towards a brake-fluid reservoir. In an energized position (I), the valve shuts off the brake-fluid reservoir and connects the annular space with the primary outlet-pressure space brake unit. An electronic control unit generates a signal for activating the brake-pressure distribution control valve so as to move it into its energized position I, when and as long as the brake unit is actuated and the anti-lock system of the vehicle has not responded.

Other objects, advantages and novel features of the present invention will become apparent from the following detailed description of the invention when considered in conjunction with the accompanying drawings.

DETAILED DESCRIPTION OF THE DRAWINGS

Figure 1:
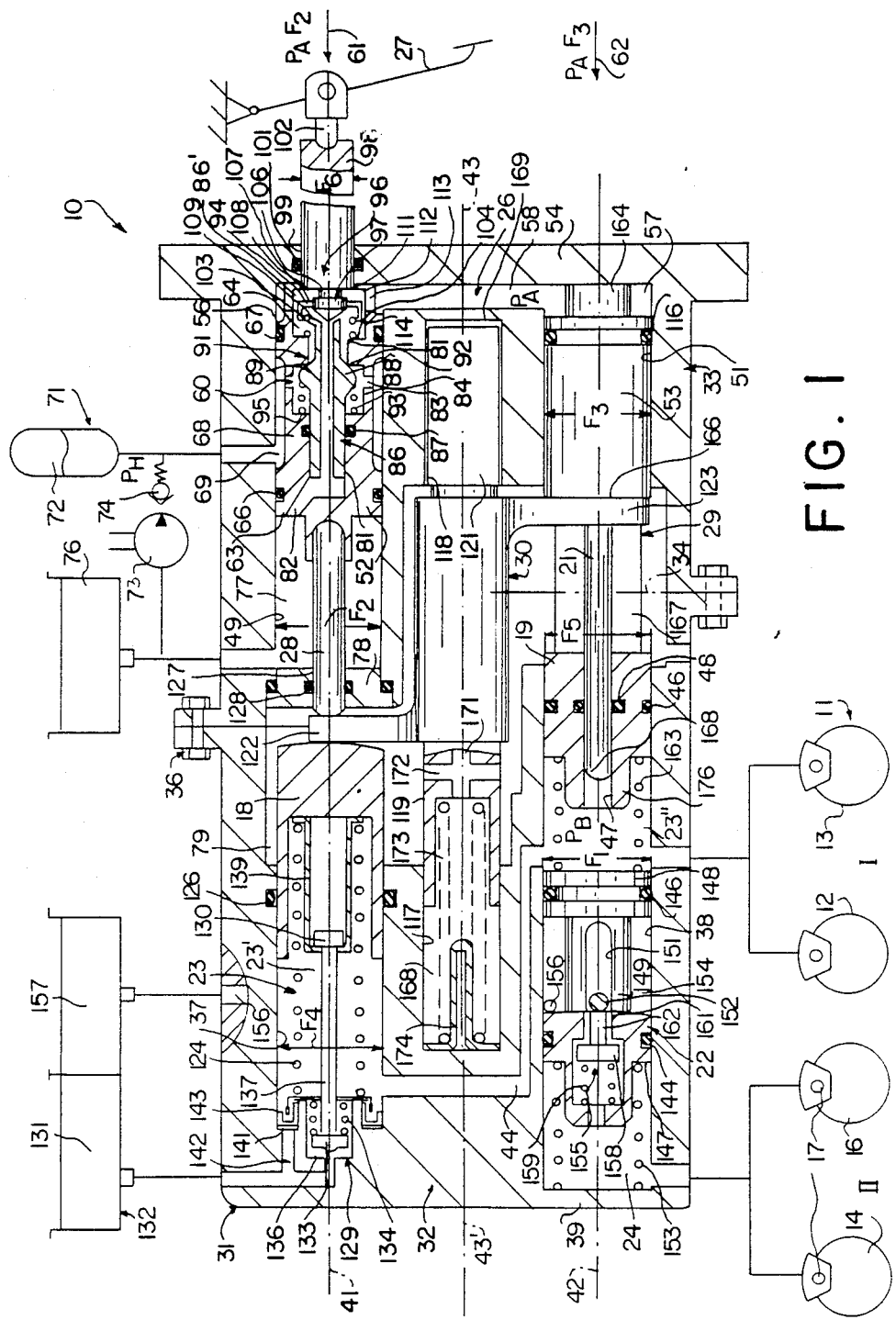
FIG. 1 shows a first exemplary embodiment of a brake unit according to the invention with a hydraulic brake booster and with two drive pistons engaging along the central longitudinal axes of housing bores.

The brake unit 10 illustrated in FIG. 1 is intended for a road vehicle with a hydraulic dual circuit braking system 11 in which the front-wheel brakes 12 and 13 are combined to form a first static brake circuit I and the rear-axle brakes 14 and 16 are combined to form a second static brake circuit II.

"Static brake circuit" means that the brake-pressure build-up and reduction in the wheel-brake cylinder 17 of the wheel brakes 12, 13 and 14, 16 of the front and rear-axle brake circuits I and II respectively, take place as a result of a force-controlled displacement of pistons 18, 19, 21 and 22 forming axially movable limitations of outlet-pressure spaces 23 and 24 of the brake unit 10, to which one of the two brake circuits I and II is connected.

Integrated in the basic brake unit 10, is a hydraulic brake booster 26 which generates a actuating force which is proportional to the force $K_P$ with which the driver actuates a brake pedal 27, provided as an actuating member of the brake unit 10, and which is transmitted positively and non-positively via axial-force transmission elements 28, 29 and 30, to those pistons 18, 19 and 21 which determine the size of primary outlet-pressure space 23 assigned to the front-axle brake circuit I.

As a result of the brake-pressure build-up in the primary outlet-pressure space 23, a force is developed to act on the secondary piston 22 limiting the other secondary outlet-pressure space 24. The force corresponds to the product $F_1 \cdot P_B$ (its effective cross-sectional surface $F_1$ and the brake pressure $P_B$ generated in the primary outlet-pressure space 23) and causes a displacement of the secondary piston 22 with the effect of reducing the volume of the secondary outlet-pressure space 24 to build up brake pressure in the rear-axle brake circuit II.

The housing 31 of the brake unit 10 is made in two parts. It comprises a block-shaped master-cylinder part 32 and a similarly block-shaped booster part 33 which rest against one another along the housing joining line 34 and can be connected firmly to one another in the illustrated relative arrangement by means of conventional screw connections 36.

Two bores 37 and 38 open towards the housing joining line 34 in the master-cylinder part and, on their side remote from the pedal, are closed off by means of an end-wall region 39 of the master-cylinder part 32. The central axes 41 and 42 of these two bores 37 and 38 extend parallel to one another and are arranged at a vertical distance from the longitudinal mid-plane 43 of the brake-unit housing 31 extending perpendicularly relative to the drawing plane. The pistons 18, 19 and 21, 22, forming the axially movable limitations of the primary outlet-pressure space 23 and the secondary outlet-pressure space 24, are guided displaceable in a pressure-tight manner in the axial direction within these two bores 37 and 38. The primary outlet-pressure space comprises two part spaces 23' and 23" which are each fixedly limited relative to the housing in the radial direction by one of the two housing bores 37, 38 and which are in constant communicating connecting with one another by means of a housing channel.

One part space 23', adjacent the piston 18, is fixedly limited axially relative to the housing by the end-wall region 39 of the master-cylinder part 32 of the housing 31. The other part space 23" of the primary outlet-pressure space 23 is movably limited on both sides, as seen in that axial direction. On its side remote from the pedal it is limited by the secondary piston 22, which also forms the axially movable limitation of the secondary outlet-pressure space 24 and is itself fixedly limited axially relative to the housing by the end-wall region 39 of the master-cylinder part 32, and on its other side by the two piston elements 19 and 21. The piston element 19, is designed as an annular piston which is sealed off relative to the housing bore 38 by means of an annular gasket 46 fixed relative to the piston. The second piston element 21 is designed as an elongate tappet-shaped plunger piston which is displaceably arranged in a pressure-tight manner in a central bore 47 of the annular piston 19 and is sealed off relative to this bore by means of an annular gasket 48 seated in an inner groove of the annular piston 19.

The block-shaped booster part 33 of the housing 31 likewise possesses two bores 49 and 51, in each of which drive pistons 52, 53 of the brake booster 26 are displaceably guided in a pressure-tight manner. In the assembled state of the housing 31, these bores 49 and 51 are arranged in line with the bores 37 and 38 of the master-cylinder part 32 of the booster housing 31, so that their central longitudinal axes coincide with the central longitudinal axes 41 and 42 of the bores 37 and 38 of the master-cylinder part 32. The two bores 49 and 51 of the booster part 33 of the housing 31 are fixedly closed-off relative to the housing by means of its end wall 54, located on the same side as the pedal. This end wall 54 also forms the axial delimitation, fixed relative to the housing, of two drive pressure spaces 56 and 57 which are limited axially movably by the drive pistons 52 and 53. These drive pressure spaces 56 and 57 are in communicating connection with one another by means of a transverse channel of the booster-housing part 33.

When these two drive pressure spaces 56 and 57 are subjected to the outlet pressure of a brake valve 60, which creates an outlet pressure $P_A$ proportional to the force $K_P$ with which the driver actuates the brake pedal 27, this force $K_P$ consequently acts on the drive pistons 52 and 53 with axial forces which correspond to the products $P_A \cdot F_2$ and $P_A \cdot F_3$ (the outlet pressure $P_A$ of the brake valve 60 and the piston surface area $F_2$ or $F_3$ of the respective drive piston 52 or 53). As a result of these forces, which act axially in the direction of the arrows 61 and 62 and which are transmitted via the axial-force transmission elements 28, 29 and 30 to the primary pistons 18, 19 and 21 to movably limit the primary outlet-pressure space 23 on one slide, the pistons 18, 19 and 21 are actuated directly (and also the second piston 22 actuated indirectly) through a displacement that effects a reduction in the volume of the primary outlet-pressure space 23 and of the secondary outlet-pressure space 24 of the brake unit 10. Brake pressure is thus built up in these outlet-pressure spaces 23 and 24 and in the wheel brakes 12, 13 and 14, 16 connected to them.

The dimensions of the drive pistons 52 and 53 of the brake booster 26 and of the primary pistons 18, 19 and 21 movably limiting the primary outlet-pressure space 23 or its part spaces 23' and 23" are such that the ratio $F_2/F_3$ is equal to the ratio $F_4/F_5$, $F_2$ denoting the effective cross-sectional surface of drive piston 52, $F_4$ denoting the effective cross-sectional surface of primary piston 18 arranged with the above-mentioned drive piston 52 along the common central longitudinal axis 41 of the bores 37 and 49, $F_3$ denoting the effective cross-sectional surface of the other drive piston 53 of the brake booster 26, and $F_5$ denoting the total cross-sectional surface of the two primary-piston elements 19 and 21, arranged coaxially relative to the central longitudinal axis 42 which is the common central longitudinal axis of the housing bores 38 and 51 of the master-cylinder part 32 and of the booster part 33 of the housing 31 of the brake unit 10.

The brake valve 60 of the brake booster 26 is integrated into the drive piston 52 which, as seen along the common central longitudinal axis 41 of the two respective bores 37 and 49 of the master-cylinder part 32 and of the booster part 33 of the housing 31, is supported centrally via the axial-force transmission element 28 on that primary piston 18 which movably limits, in a pressure-tight manner, the part space 23', fixedly limited axially relative to the housing, of the primary outlet-pressure space 23.

The drive piston 52 has two piston flanges 63 and 64 which are arranged at an axial distance from one another and which are each sealed off from the housing bore 49 by means of an annular gasket 66, 67 fixed relative to the piston. Between these piston flanges 63 and 64, the drive piston 52 has a shallow outer groove 68 forming the radially inner limitation of an inlet-pressure space 69, in the form of an annular gap, of the brake valve 60. Inlet pressure space 69 is fed high outlet pressure $P_H$ from an auxiliary pressure source 71, which belongs to the brake booster 26 and which, in a design conventional for this purpose, comprises a pressure accumulator 72 which is connected permanently to the inlet-pressure space 69 and which can be charged with pressure medium from a pressureless reservoir 76 of the auxiliary pressure source 71 by means of a charging pump 73 via an accumulator and non-returning charging valve 74. That flange 63 of the drive piston 52, which is remote from the pedal, delimits the inlet-pressure space 69 from a compensating space 77 which is connected permanently to the reservoir 76 of the auxiliary pressure source 71. This compensating space 77 is finally closed off in the axial direction relative to the housing by means of a plug 78 inserted into the housing bore 49 and is delimited from a leakage-oil space 79 which extends between the block-shaped regions of the master-cylinder part 32 and of the booster part 33 of the brake-unit housing 31 and which is kept "pressureless" i.e. under atmosphere pressure, like the pressure-medium reservoir 76 of the auxiliary pressure source 71.

The drive piston 52 has a central axial bore 81 which opens into the drive pressure space 56 and extends over most of the length of the drive piston 52 and which, in the region of its piston flange 63 delimiting the inlet-pressure space 69 from the compensating space 77, is in communicating connection with a compensating space 77 via a compensating channel 82.

The central axial bore 81, over a middle portion of its length, has a radial widening 83, which is in the form of an annular groove, and which, via radial bores 84 of the drive piston 52, is in constant communicating connection with the inlet-pressure space 69 of the brake valve 60 through an annular gap.

The brake-valve body 86 is designed as an essentially tubular tappet which is axially and displaceably guided within the central bore 81 of the drive piston 52 and which is sealed off from the central bore 81 of the drive piston 52 by means of an annular gasket 87, fixed relative to the piston and located inside that portion of the central bore 81 following the radial widening 83 on the side remote from the pedal.

Within the annular radial widening 83 of the central piston bore 81, the valve body 86 has a radial rib 88 with an outer surface 89 tapering conically on the same side as the pedal and forming the sealing surface of a first conical seat valve 91, the seat 92 of which is formed by the annular inner mouth edge of that portion 81' of the piston bore 81 extending between the annular radial widening 83 of the piston bore 81 and the drive pressure space 56 of the drive piston 52.

The outside diameter portion 86' of valve body 86, located on the same side as the pedal and following the conical radial sealing rib 88, has a diameter somewhat less than the diameter of the bore portion 81' located on the same side as the pedal and in a typical design amounts to approximately four fifths thereof. A prestressed valve spring 93 which, is supported between the radial flank 95 on drive piston 52 and a flank on the radial rib 88 of the valve body 86 facing this, forces the first seat valve 91 of the brake valve 60 into a blocking position. The tubular portion 86' of the valve body 86, located on the same side as the pedal, projects into the drive pressure space 56 by means of a free portion, the length of which corresponds at least to the maximum axial stroke of a valve body 86 and is approximately equal to this stroke. A free mouth edge 94, located within the drive pressure space 56 of the end portion 86' of the valve body 86 forms the seat of a second conical seat valve 96. A frustoconical valve body 97 of this second valve 96 is arranged at the inner end of a piston-shaped push rod 98, which is guided displaceably in a pressure-tight manner in a bore 99, coaxial relative to the central longitudinall axis 41 of the drive piston 56 and located in that end wall 54 of the booster part 33 of the brake-unit housing 31 on the same side as the pedal. An annular gasket 101, fixed relative to the housing, is provided for sealing off this push rod 98 from the housing bore 99. The pedal engages essentially axially on this push rod 98 via the pedal tappet 102 connected to the brake pedal 27 in an articulated manner, with its actuating force being equal to the product $K_P \cdot \ddot{u}$ (the pedal ratio $\ddot{u}$ and the force $K_P$ with which the driver depresses the brake pedal 27).

This second conical seat valve 96 is forced by a second prestressed valve spring 103 into its open position, in which the drive pressure spaces 56 and 57 of the brake booster 26 are in communicating connection with its compensating space 77, that is to say are relieved of pressure.

That piston flange 64 of the drive piston 52, located on the same side of the pedal, has a short sleeve-shaped extension 104, by means of which, in the illustrated basic position corresponding to the non-actuating state of the brake unit 10, it is supported on the end wall 54 of the booster part 33 of the housing 31.

U-shaped stop sleeve 108 is anchored, by means of a radially inward-pointing bottom flange 107, in an annular groove 106 arranged between the conical valve body 97 and the inner end of the piston-shaped push rod 98. The sleeve 10 is displaceably guided by means of its outer surface 109 in a sliding manner on the inner cylindrical surface of the sleeve-shaped extension 104 of the drive piston 52.

The second valve spring 103 is supported in the inner face of the radially inward-pointing flange 107 of the stop sleeve 108 which confronts the drive piston 52. The sleeve-shaped extension 104 of the drive piston 52 is itself equipped, at its free end, with a radially inward-pointing stop flange 111 which engages behind the outer edge of the likewise radially inward-pointing sleeve flange 107 and with the result that the push rod 98 is restrained on the drive piston 52. Axial scores 112 ae made in the outer surface 109 of the stop sleeve 108 on the outside, and furthermore the sleeve-shaped extension 104 of the drive piston 52 is equipped with radial orifices 113 so that the working medium of the brake booster 26 can flow out of the space between the drive piston 52 and the stop sleeve 108 of the push rod 98 and into the bore space surrounding this via the transverse channel 58, and from there to the drive pressure space 57 of the other drive piston 53.

The maximum stroke which the push rod 98 can execute in relation to the drive piston 52 is limited by the support of the end face of the stop sleeve 108 on the annular stop surface 114 of the drive piston 52, which is located on the same side as the pedal.

The drive piston 53, movably limiting the other drive pressure space 57 of the brake booster 26, is designed as a circular-cylindrical piston which completely fills the housing bore 51, is coaxial relative to the central longitudinal axis 42 of the booster part 33 and is sealed off from this housing bore 51 by means of only one sliding gasket 116, fixed relative to the piston and arranged on its end portion facing the drive pressure space 57.

Along a central longitudinall axis 43' of the housing 31, extending in the longitudinal mid-plane 43 of the housing 31, the housing parts 32 and 33 are equipped with mutually aligned guide bores 117, 118 which are designed as blind bores and which are open towards the leakage-oil space 79.

The yoke-shaped axial-force transmission element 30 is displaceably guided axially, to and fro in each of these blind bores 117 and 118 by guide extensions 119, 121, and is equipped with two radially projecting supporting arms 122, and 123. Supporting arm 122 which is the upper according to FIG. 1, axially supports the drive piston 52 containing the brake valve 60 via the axial-force transmission element 28 shown as a slender tappet. The other radial supporting arm 123 axially supports the other drive piston 53, the lower according to FIG. 1, of the brake booster 26.

Axially supported on the upper radial supporting arm 122 of the yoke 30 is a piston 18 which movably delimits space 23' of the primary outlet-pressure space 23 and which is spring biased against the upper supporting arm 122 by means of a prestressed restoring spring 124. The piston 18 is sealed off from space 23' of housing bore 37 by an annular gasket 126 fixed relative to the housing. The tappet 28, extending between the upper supporting arm 122 and the drive piston 52, is displaceably guided in a central bore 127 of the plug 78, delimiting the compensating space 77 of the brake booster 26 from the leakage-oil space 79 in the housing 31, and is sealed off from this bore 127 by means of the annular gasket 128 fixed relative to the plug.

The upper part space 23' of the primary outlet-pressure space 23 is equipped with a central valve, 129, which in the illustrated basic position, (corresponding to the non-actuated state of the brake unit 10, of the primary piston 18 and of the further elements of the brake unit 10 which are displaceable as a result of pedal actuation,) assumes its open position, in which a chamber 131 assigned to that primary outlet-pressure space 23 of the brake unit 10 and belonging to the brake-fluid reservoir 132 is in communicating connection with the primary outlet-pressure space 23. Consequently pressure compensation can occur between the primary outlet-pressure space 23 and the chamber 131 of the brake-fluid reservoir 132. This central valve 129, has the property of assuming its blocking position after a small initial portion of a brake-pressure build-up stroke of the primary piston 18, after which, pressure can be built up in the primary outlet-pressure space 23.

This central valve 129 is designed as a poppet seat valve, having a valve body 133 which is forced by a prestressed valve spring 134 up against the annular valve seat 136 opening, centrally in the part space 23' of the primary outlet-pressure space 23, and is restrained on the piston 18 by means of a restraining flange 138 located at the piston end of an elongate bar-shaped extension 137 cooperating with a restraining sleeve 139 fixed relative to the piston 18. The valve body 129 lifts off from its valve seat 133 only when the piston 18 directly approaches its basic position illustrated.

Inserted into an annular groove 141, which coaxially surrounds the central valve 129 and the bottom of which opens at least one overflow channel 142 in communicating connection with the chamber 131 of the brake-fluid reservoir 132, is a lip gasket 143. As long as the pressure in the primary outlet-pressure space 23 of the brake unit 10 is higher than that in its brake-fluid reservoir 132, the lip gasket 143 keeps the mouth orifice of the overflow channel 142 closed. In the event of a rapid return movement of the piston 18 to effect a reduction of the brake pressure, the lip gasket 143 allows brake fluid to flow out of the brake-fluid reservoir 132 into the primary outlet-pressure space 23 of the brake unit 10, even when the central valve 129 is still closed.

The secondary piston 22 limiting the secondary outlet-pressure space 24 of the brake unit 10 has two flanges 147, 148 which are arranged at an axial distance from one another and are each sealed off in a pressure-tight manner from the bore 38 by means of annular gaskets 144, 146 fixed relative to the piston and which are connected to one another by means of a piston rod 149. This piston rod 149 has a longitudinal slot 151 which extends between the mutually confronting sides of the piston flanges 147 and 148 and through which a stop pin 152 passes radially and is arranged fixedly. When flange 147 of the secondary piston 22 limiting the secondary outlet-pressure space 24 comes to bear on this stop pin 152, this marks the illustrated basic position of the secondary piston 22 corresponding to the non-actuated state of the brake unit. The secondary piston 22 is forced into this illustrated basic position by a prestressed restoring spring 153 supported between the end wall 39 of the master-cylinder part 32 of the brake-unit housing 31 and the flange 147.

An annular space between the two piston flanges 147 and 148 of the secondary piston 22 is connected, via a compensating channel 156 (of which only the mouth orifice always located between the two piston flanges 147 and 148 and its connecting orifice are shown) to a second chamber 157 at the bottom of brake-fluid reservoir 132.

A central valve of a type known per se, which is designated as a whole by 155 and which corresponds in functional terms to a central valve 129 of the primary brake circuit I, is integrated in the secondary piston 22. It is designed as a poppet seat valve having a valve body 158 in the form of an annular flange and which is forced by a prestressed valve spring 159 into a blocking position in which it rests sealingly on the valve seat formed by the annular surface centerally of flange 147. When the central valve 155 is in the open position, it connects the secondary outlet-pressure space 24 to the annular space 154.

The valve body 158 is equipped with a tappet-like stop extension which passes through the compensating time channel 161 and is slightly longer than the axial extent of the compensating channel 161. The tappet extension can be supported one the stop pin 152. When the stop extension 162 comes to bear on the stop pin 152, in the basic position of the secondary piston 22 and in the immediate vicinity of this basic position, the valve body 158 is consequently held in its illustrated lifted off position from the valve seat. Then pressure compensating can occur between the secondary outlet-pressure space 24 and the second chamber 157 of the brake-fluid reservoir 132.

A further prestressed restoring spring 163 is supported axially, between the secondary piston 22 and the annular piston 19 of the primary-piston arrangement. The annular piston 19 is forced into its illustrated position, which corresponds to the non-actuated state of the brake unit 10 and in which the circular-cylindrical drive piston 53 also assumes its basic position in which it is supported by means of a rear supporting extension 164 on the pedal-side end will 54 of the booster part 33 of the housing 31. Annular piston 19 is equipped with two axial supporting extensions, located on opposite sides of piston 21, and which act as axial-force transmission elements 29 on lower supporting arm 123 of the yoke 30. Yoke 30 is located axially on that plane end face 166 of the drive piston 53 facing the leakage-oil space 79. The axial supporting extensions have plane limiting faces 167 extending at a radial distance from the plunger piston 21, to form sliding guide faces for the supporting arm 123 of the yoke 30 which is thereby guided in the illustrated orientation of its supporting arms 122 and 123. The plunger piston 21 is connected fixedly in terms of axial displacement to a yoke 30, or to its lower supporting arm 123, so that it always jointly executes the same axial movement.

The plunger piston 21 is somewhat shorter than the annular piston 19. The term shorter meaning that, as seen in the basic position shown, the axial distance between its free end 168 and that surface of the right hand piston flange 146 of a secondary piston 22 is somewhat greater than the measured distance between the annular piston 19 and the secondary piston 22, but smaller than the maximum stroke over which the plunger piston 21 is displaceable relative to that floating piston 22.

The housing cavities 168 and 169 at the ends the guide bores 117 and 118 housing extensions 119 and 121 of yoke 30, located centrally of the housing parts 32 and 33, are appropriately kept in communicating connection with the leakage-oil space 79 and are therefore pressureless by connection with a continuous logitudinal bore 171 and a transverse bore 172 intersecting the latter.

A prestressed restoring spring 173 is displaceable arranged in the housing 168 and urges the yoke 30 into its illustrated basic position. The spring 173 is supported between the bottom of the blind bore 117 and a pot-shaped axial depressing of the guide extension 119. The axial depth of this depression corresponds approximately to the block length of the restoring spring 173. This restoring spring 173 is centered by means a slender centering tube 174.

The brake unit 10 according to the invention, thus far explained in terms of its construction, works as follows, with fault-free functioning being considered first:

When the brake unit 10 is actuated, a drive pressure (proportional to the pedal force $K_P$ and derived from the outlet pressure of the auxiliary pressure source 71 by the brake valves 60) is fed into the drive pressure spaces 56 and 57 on one side of the drive pistons 52 and 53. The drive pistons 52 and 53 thereby experience a leftward displacement which is transmitted by means of the axial-force transmission elements 28, 29 and 30 to the primary piston 18 and the primary-piston arrangement 19, 21, with the result that these piston elements 18, 19 and 21 experience a leftward displacement to cause a pressure build-up in the two part spaces 23' and 23" of the primary outlet-pressure space 23. Indirectly, the secondary piston 22 also experience a displacement due to the pressure buildup in space 23" to cause a pressure build-up in the secondary outlet-pressure space 24. Brake pressure is accordingly built up in the brake circuit I and in the brake circuit II. A feedback relating to the amount of the brake pressure prevailing in the wheel brakes is obtained, if the outlet pressure of the brake valve 60 acting in the drive pressure spaces 56 and 57 also acts on the push rod 98, thus producing a "feedback force" which counteracts the actuating force and the amount of which is determined by the product of the outlet pressure $P_A$ of the brake valve 60 and the effective cross-sectional surface $F_6$ of the push rod 98.

In the event of a failure of the rear-axle brake circuit II, braking with brake boosting can be continued in the front-axle brake circuit I because the brake-pressure build-up in the primary outlet-pressure space 23 occurs only after the secondary piston 22 has come to bear on the end wall 39 of its bore 38. This results in a lengthening of the pedal travel, which is acceptably small however, owing to the smaller surface of the secondary piston 22 in relation to the total cross-sectional surface of the primary pistons 18, 19 and 21.

In the event of a failure of the front-axle brake circuit I, brake boosting is maintained for the rear-axle brake circuit. However, since no pressure build-up is possible in the primary outlet-pressure space 23 and consequently the primary pistons 18, 19 and 21 are not exposed to any direct hydraulic reaction, a brake-pressure build-up in the rear-axle brake circuit II is obtained only when the annular piston 19, which, together with the plunger piston 21, has its extension 176 run onto the secondary piston 22. The effective surface critical for the pressure build-up in the secondary outlet-pressure apace 24 and of the hydraulic reaction is now only the cross-sectional surface $F_1$ of the secondary piston 22, which, is albeit not necessarily equal to the total effective surface $F_5$ of the annular piston 19 and of the plunger piston 21. Because the effective surface of the primary pistons 18, 19 and 21 are reduced by the amount of the effective surface of the primary piston 18, a higher outlet pressure is obtained in the secondary outlet-pressure space 24, in comparison with the fault-free operation of the brake unit 10 than with the same actuating force and a boosting effect proportional to this. This "pressure jump", with the effect of an increase of the brake pressure in the secondary outlet-pressure space 24, thus achieves a correspondingly higher vehicle deceleration for a predetermined pedal force.

In the event of a failure of the brake booster 26, say do to a failure of the auxiliary pressure source 71, the actuating force is transmitted via the push rod 98 only to the drive piston 52 containing the brake valve 60 and therefore also to the primary piston 18, which limits the part space 23' at the primary outlet-pressure space 23, and via the yoke 30 to the plunger piston 21. The other drive piston 53 and the annular piston 19 remain "stationary". The reactive surface of the primary pistons 18, 19 and 21 is thus reduced by the amount of that effective cross-sectional surface of the annular piston 19. This, requires a lengthening of the pedal travel, and puts into effect a "ratio jump", with the result that, in comparison to a booster with constant effective surfaces, higher brake pressures are generated in the primary outlet-pressure space 23 and in the secondary outlet-pressure space 24 and therefore a relatively higher vehicle deceleration is achieved, without any change-over and with a predetermined pedal-actuating force.

If both the brake booster 26 and the front-axle brake circuit I fail, a pressure build-up takes place in the secondary outlet-pressure space 24, as soon as the plunger piston 21 runs onto the secondary piston 22. Consequently the actuating force introduced via the push rod 98, the yoke 30 and the plunger piston 21 acts on the secondary piston 22. Emergency braking is still possible even in this case.

Because the plunger piston 21 is shorter than the annular piston 19, with brake circuits I and II otherwise intact, a differing pressure generation can occur in the primary outlet-pressure space 23 and in the secondary outlet-pressure space 22, because of differing ventilation states of the two brake circuits I and II, only when the plunger piston 21 runs onto the secondary piston 22. Only from this piston position is it possible, as a result of a further piston displacement, to build up a higher brake pressure in the secondary brake circuit II than in the front-axle brake circuit I if the front-axle brake circuit I, has the poorer ventilation. This is important in an emergency, involving the failure of the brake booster 26, to prevent "over-braking" of the rear axle in the partial braking range and guarantee good dynamic stability of the vehicle. On the other hand, with this design of the annular piston 19 and of the plunger piston 21, if only the front-axle brake circuit I fails, there is the situation that, with brake boosting intact, the annular piston 19 comes up against the secondary piston 22 even earlier, thus also meeting practical needs, since in this situation it is necessary to have the possibility of building up brake pressure on the rear axle as early as possible.

Figure 2:
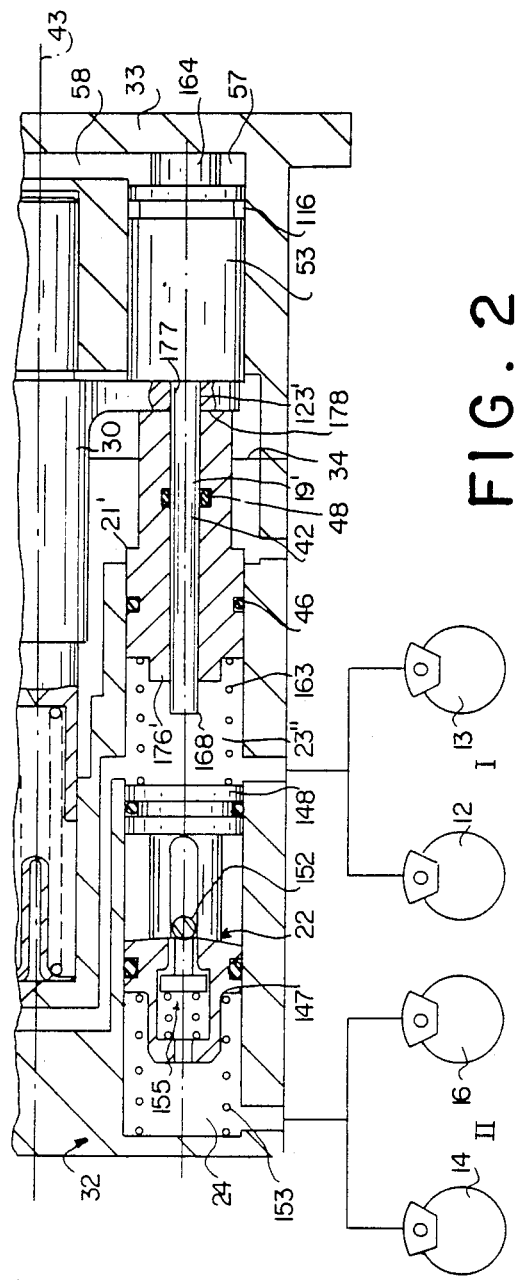
FIG. 2 shows details of a first alternative design of the primary-piston elements which are arranged displaceably in the housing bore containing the secondary piston of the brake unit.

In the alternative version of the brake unit 10 which is shown in FIG. 2, the details of which reference will now be made, and which is identical in functional terms to the brake unit 10 according to FIG. 1, only those elements differing in constructional terms from functionally corresponding elements of the brake unit 10 according to FIG. 1 are shown.

The elements of the brake unit 10 according to FIG. 2, which are constructionally identical to elements of a brake unit 10 according to FIG. 1, are given the same reference symbols as in FIG. 1. To this extent, attention is drawn to the description parts belonging to FIG. 1, and also insofar as FIG. 2 has reference symbols, not mentioned in the following description. In as much as elements of the brake unit 10 according to FIG. 2 are not constructionally identical to, but functionally similar to elements of the brake unit 10 according to FIG. 1, the same reference symbols are used for such functionally similar elements as the corresponding elements of FIG. 1, but they bear a prime mark.

According to FIG. 2, these are the annular piston 21' functionally similar to the plunger piston 21 according to FIG. 1, the plunger piston 19' similar to the annular piston 19 according to FIG. 1, and the supporting arm 123' of the yoke-shaped axial-force transmission element 30. This supporting arm 123' points downwards according to the drawing and has a continuous central guidebore 177 which allows for a sliding displaceability of the yoke 30 in relation to the plunger piston 19'.

As illustrated for the sake of simplicity in FIG. 2, the plunger piston 19' can be designed as an axial extension made in one piece with the drive piston 53 or restrained to the drive piston 53 in a manner not specifically shown. Accordingly it remains stationary with the drive piston 53, if the latter in the event of a failure of the auxiliary pressure source, 71, remains in its illustrated basic position linked to the non-actuated state of the brake unit 10.

Here, the annular piston 21' is designed over its entire length as a piston which is rotationally symmetrical relative to the central longitudinal axis 42 and which can be produced as a simple lathe-turned part with a central longitudinal bore. It is supported on the radical supporting arm 123' by means of its annular end face 178 confronting the latter and is kept bearing on this by the restoring spring 163.

Its end extension 176' facing the secondary piston 22 is somewhat shorter that the supporting extension 176 of the annular piston 19 according to FIG. 1. Instead, the plunger piston 19' is somewhat longer than the plunger piston 21 according to FIG. 1, so that, as seen in the basic position illustrated its free end projects axially into the lower part space 23" of the primary outlet-pressure space 23 arranged at a shorter axial distance from the piston flange 148 of the secondary piston 22 than the annular end face of the end extension 176' of the annular piston 21'. Hence the piston 21 can itself be supported on the secondary piston 22, should the drive piston 53 and therefore the plunger piston 19' remain stationary in the illustrated basic position in the event of a failure of the auxiliary pressure source 71.

The brake unit 10 according to FIG. 2 is identical in functional terms to that according to FIG. 1, and therefore to that extent also, reference can be made to the description given for this.

To explain a further modification of brake unit encompassed by the inventive idea and designated as a whole by 110, reference will now be made to FIG. 3.

Figure 3:
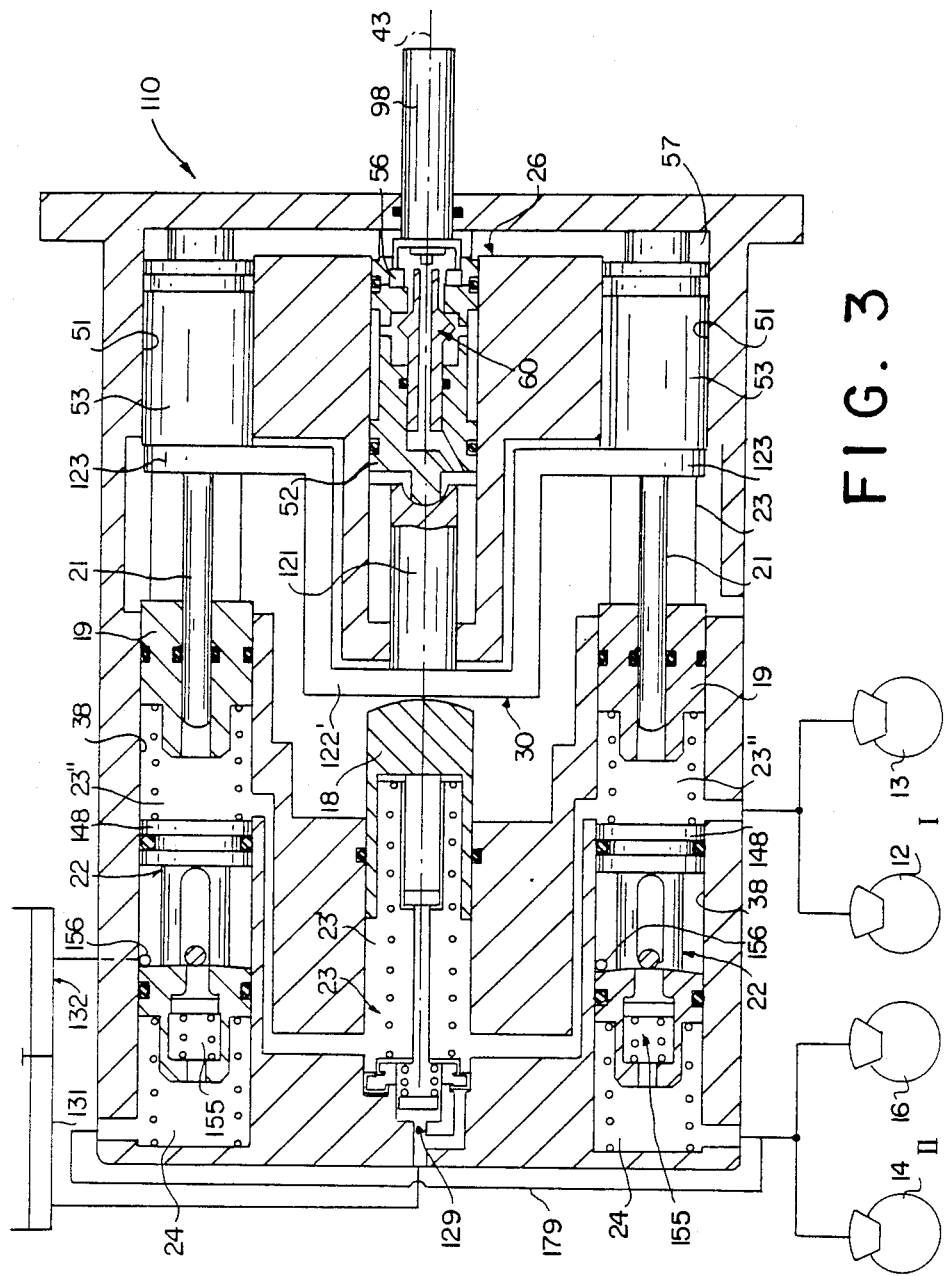
FIG. 3 shows a further exemplary embodiment of a brake unit according to the invention with an arrangement, which is symmetrical relative to its central longitudinal axis.

In FIG. 3, similair elements of the brake unit 110 are given the same reference symbols as elements of the brake unit 10 according to FIG. 1, and therefore attention is once again drawn to their basic constructional identity and functional similarity in the relevant description part relating to FIG. 1.

The brake unit 110 according to FIG. 3 is obtained, as it were, as a "mirror image" of the brake unit 10 according to FIG. 1 in the plane extending perpendicularly relative to the drawing plane and containing the central longitudinal axis 41, along which are arranged the part space 23' of the primary outlet-pressure space 23 limited movably on one side by the primary piston 18, as well as the drive piston 52 containing the brake valve 60 and the push rod 98, via which the pedal force $K_P$ introduced into the brake unit 10, 110, either as a control force when the brake booster is intact, or as an actuating force in the event of a malfunction of the brake booster.

Accordingly, the primary outlet-pressure space of the brake unit 110, once again designated as a whole by 23, comprises three part spaces, namely the central part space 23' and the two "outer" part space 23" which are in communicating connection with one another and which are connected jointly to the front-axle brake circuit I. Furthermore, the brake unit 110 possesses two secondary outlet-pressure spaces 24 which, as indicated diagrammatically by a connecting line 179, are likewise in communicating connection with one another and are connected jointly to the rear-axle brake circuit II.

In a corresponding duplication and symmetrical arrangement, there are two drive pistons 53 which correspond to the drive piston 53 of the brake unit 10 according to FIG. 1 and which can be supported axially on the lateral supporting arms 123 of the generally symmetrical yoke 30. The central, here likewise symmetrical yoke leg 122" axially supports the primary piston 18 to limit the centrally arranged part space 23' of the primary outlet-pressure space 23 which, in the illustrated basic position of its primary and secondary piston arrangement corresponding to the non-actuated state of the brake unit 110, is in communicating connection via the central valve 129 with the chamber 131 assigned to the front-axle brake circuit I and belonging to the brake-fluid reservoir 132.

The drive piston 52 containing the brake valve 60 is also arranged centrally in accordance with the symmetry of the brake unit 110 and, via the tappet-like axial-force transmission element 28, engages centrally on the symmetrical supporting leg 122 of the yoke-shaped axial-force transmission element.

As can be seen immediately, the brake unit 110 according to FIG. 3 functions identical to the brake unit 10 according to FIG. 1.

Because of the symmetrical arrangement of the primary pistons 18 and 21 and of the secondary pistons 22 in relation to the central axis 41 of the brake unit 110 and the likewise symmetrical arrangement of the drive pistons 53 and symmetrical design of the yoke-shaped axial-force transmission element 30, no transverse force act on the latter. If in the event of a failure of the brake booster 26, the brake unit 110 has to be actuated solely by pedal force, in contrast to the brake unit 10 according to FIG. 1, there is no need for axial guide elements for the yoke 30 which modification involves a relatively high outlay of expense.

In a "first approximation", that is to say apart from deviations which can arise as a result of production tolerances of the housing bores 38 and 51, of the drive pistons 53 and of the master-cylindrical pistons 18, 21 and 22, the yoke 30 is completely free of traverse forces. The brake unit 110 can therefore be produced in a design somewhat lighter than that of the brake unit 10 according to FIG. 1, with the result that the additional technical outlay involved in the symmetrical design of the brake unit 110 can be at least partially compensated again.

It goes without saying that the brake unit 110 illustrated in FIG. 3 can also be produced with the modification described by means of FIG. 2 with reference to the brake unit 10 according to FIG. 1.

To explain yet another further brake unit likewise encompassed by the inventive idea and designated as whole by 210, reference will now be made to the details of FIG. 4.

Figure 4:
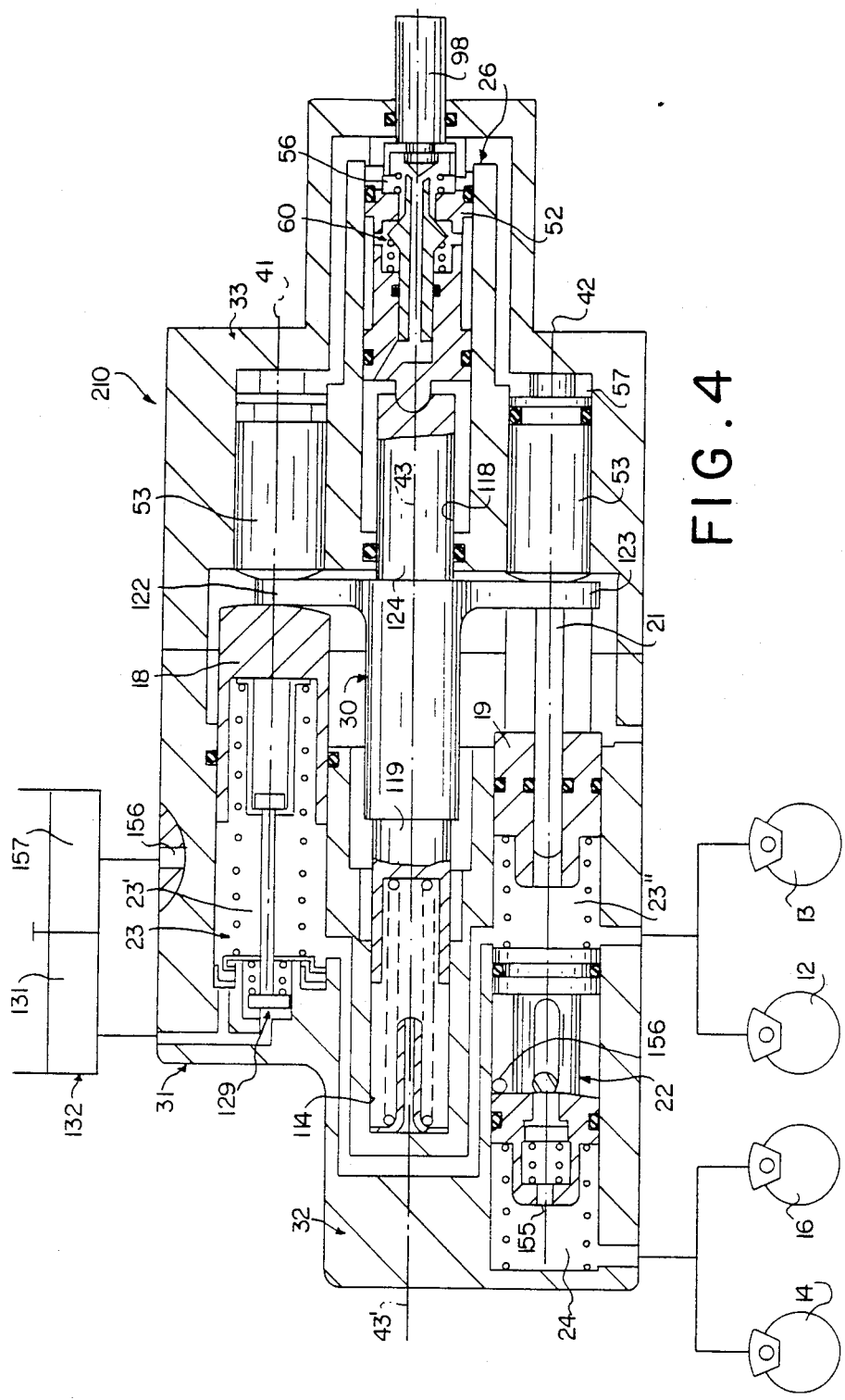
FIG. 4 shows a further exemplary embodiment of a brake unit according to the invention with an asymmetric arrangement of the primary and secondary piston elements limiting the outlet-pressure spaces, but with a symmetrical design of the brake booster, in a representation corresponding to that of FIG. 1.

In FIG. 4, elements of the brake unit 210 are given the same reference symbols as elements of the brake unit 10 according to FIG. 1 or elements of the brake unit 110 according to FIG. 3, attention will therefore once again be drawn to their basic constructional identity and functional similarity and moreover reference is made to the relevant description parts relating to FIGS. 1 and 3 with regard to those elements of the brake unit 210 according to FIG. 4 for which only reference symbols are given, but which are not specifically mentioned in the following description.

The brake unit 210 according to FIG. 4 corresponds to the brake unit according to FIG. 1 as regards the division of a primary outlet-pressure space 23 assigned to the front-axle brake circuit I into two part spaces 23' and 23" and the tandem arrangement of the secondary outlet-pressure space 24 assigned to the rear-axle brake circuit II with the part space 23" belonging to the primary outlet-pressure space 23 and delimited from the former by the floating piston 22. The primary pistons 18, 19 and 21 movably limiting the primary outlet-pressure space 23 are produced in the same design as in the brake unit 10. The same applies to the secondary piston 22 which, in a tandem arrangement with the piston elements 19 and 21, limits movably in a pressure-tight manner, the part space 23" of the primary outlet-pressure space 23 and, the secondary outlet-pressure space 24 of the brake unit 210 within the master-cylinder part 32 of its housing 31.

The yoke-shaped axial-force transmission element 30 is designed symmetrically here, insofar as its two radial supporting arms 122 and 123 are arranged symmetrically in respect of the longitudinal mid-plane 43 of the brake unit 210 which is perpendicular to the drawing plane. The upper supporting arm 122 is supported axially on the primary piston 18 and the other supporting arm 123 is fixedly connected to the plunger piston 21 in terms of axial displacement.

In the brake unit 210 the axial-force transmission yoke 30 is guided axially displaceably and by respective guide extensions 119 and 121 in mutually aligned guide-bores 117 and 118 of the master-cylinder housing part 32 and of the booster part 33 of the brake-unit housing 31.

As regards the basic construction of its brake booster 26, the brake unit 210 according to FIG. 4 corresponds to the brake unit 110 with two drive pistons 53 which are arranged symmetrically along the central longitudinal mid-plane 43 of the brake unit 210, extending vertically relative to the drawing plane and the central longitudinal axes of which coincide with the central longitudinal axes 41 and 42 of the housing bores 37 and 38 of the master-cylinder part 32. The primary and secondary pistons 18, 19 and 21, 22 of the brake unit 210 are guided displaceably in a pressure-tight manner. A centrally arranged drive piston 52 which contains the brake valve 60 and which engages on that guide extension 121 of the yoke-shaped axial-force transmission element 30 is located on the same side as the booster.

Because, in the brake unit 210 according to FIG. 4, as in the brake unit 110 according to FIG. 3, altogether three drive pressure spaces of the brake booster 26 are provided, namely the central drive pressure space 56 limited axially movably by the drive piston containing the brake valve 60 and, in a symmetrical arrangement with respect of the central longitudinal axis 43, and two drive pressure spaces 57, each limited axially movably by one of the two drive pistons 53. These drive pistons can be produced with comparatively smaller cross-sectional surfaces than in the brake unit 10 according to FIG. 1, or a brake-boosting auxiliary pressure source working at a comparatively low outlet-pressure level can be used as an auxiliary pressure source for the brake booster 26.

In comparison with the brake unit 10 according to FIG. 1, the advantage of the brake unit 210 according to FIG. 4 is that the transverse forces which arise during an emergency actuation of the brake unit 210, that is to say in the event of a failure of the brake booster 26, and which act on the axial-force transmission element 30 and then must be absorbed by the longitudinal guides 117, 119 and 118, 121 are substantially lower than that transverse forces arising in the event of a corresponding malfunction in the brake unit 10 according to FIG. 1 and, compared with these, are only approximately half as great in accordance with the symmetrical designed of the drive part of the brake unit 210.

Apart from this functional difference, advantageous for emergency actuation, the brake unit 210 according to FIG. 4 is completely identical in functional terms to the brake unit 10 according to FIG. 1.

It goes without saying that, in the brake units 110 and 210 according to FIGS. 3 and 4, because of the duplicated drive pistons 53 in a symmetrical arrangement in respect of the longitudinal mid-plane 43, there is no need for a central drive piston 52, but instead of this it would be possible to provide only one brake valve 60 which can be produced in many known ways and which supplies only a drive pressure which is proportional to the pedal force $K_P$ with which the driver actuates that brake pedal 27. A brake valve 60 of this type has to be designed to the effect that, if the auxiliary pressure source 71 has failed, it allows for transmission of the pedal-actuating force to the yoke-shaped axial-force transmission element 30, although this does not present any difficulties in technical terms. Furthermore, it goes without saying that the designs, explained specially with reference to FIGS. 1 to 6, of the brake valves 60, of the drive piston 52 and of the central valves 129 and 157, which in their basic positions make the communicating connections between the primary outlet-pressure space 23 and secondary outlet-pressure space 24 and the chambers 131 and 157 assigned to them and belonging to the brake-fluid reservoir 132, can also be produced in a way other than that shown.

In a braking system equipped with a brake unit 10, 110 or 210, as explained with reference to FIGS. 1 to 4, a fixed setting of the installed brake-force distribution is obtained in conjunction with the designed of the wheel brakes, insofar as there are no further brake-pressure regulating elements. That is, there are no brake-force distribution controllers, pressure modulators or the like, so that the ratio $B_{HA}/B_{VA}$ of the rear-axle brake-force fraction $B_{HA}$, exerted during a braking operation, to the front-axle brake force fraction $B_{VA}$, exerted during this braking operation, has a fixed value, for example the value 0.5. This means that ⅔ of the particular brake force exerted is applied to the front axle and ⅓ to the rear axle.

Figure 5:
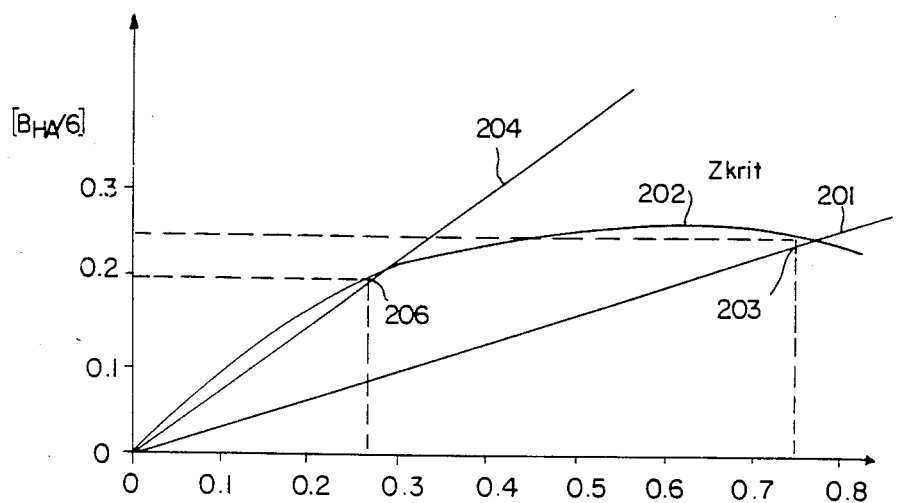
FIG. 5 shows a brake-force diagram to explain the change-over device, by means of which the installed brake-force distribution can be set to two different respective fixed values.

In a brake-force distribution diagram shown in FIG. 5, the front-axle brake-force fraction $B_{VA}/G$ (related to the vehicle weight G) is plotted on the abscissa and the rear-axle brake-force fraction $B_{HA}/G$ (likewise related to the vehicle weight G) is plotted on the ordinate. The fixed-setting brake-force distribution of 0.5 is represented by the straight line 201, the gradient of which has the value 0.5.

In such a diagram, the "ideal" brake-forced distribution corresponding to unequal adhesion utilization on the front wheels and the rear wheels of the vehicle during a braking operation is represented by the parabola 202, the course of which is determined by the axle-base parameters specific to the vehicle and by the parameters dependent on the construction of the vehicle and on its load state, namely the height of the center of gravity of the vehicle and the axle-load distribution.

In the selective representation, the parabola 202 of the ideal brake-force distribution, which at the origin of the coordinates starts with a positive gradient determined by the parameters, falls again at higher values of the front-axle brake-force fraction and intersects the abscissa of the diagram at a point corresponding to a braking situation, in which brake force can now only be transmitted via the front-wheel brakes, and no longer via the rear-wheel brakes, since the rear axle starts to lift off as a result of the dynamic behaviour of the vehicle under braking.

In the illustrated quadrant of the brake-force distribution diagram, the regions of stable braking behaviour and of unstable braking behaviour are delimited from one another by the parabola 202. For the pairs of front-axle/rear-axle brake-force values lying underneath the parabola 202, a stable braking behaviour of the vehicle is obtained, which is such that the front wheels of the vehicle lock earlier than the rear wheels if, the adhesion coefficients between the roadway and the vehicle wheels are not sufficient to transmit the brake force. For pairs of values of the front-axle/rear-axle brake-force distribution which lie above the parabola 202, the rear axle is "over-braked" and the rear wheels lock first, with the result that the vehicle tends to serve and becomes unstable.

To obtain a braking system designed to ensure a sufficient dynamic stability of the vehicle, the fixed setting installed brake-force distribution is such that its straight line 201 intersects the parabola 202 at a point 203 corresponding to a critical vehicle deceleration $Z_{crit}$ which, at higher adhesion coefficients, can at most attain a value of under full braking with the maximum possible brake force. That is to say with a braking deceleration related to the vehicle weight of 1. This means, however, that during most braking situation, the rear-wheel brakes are utilized and therefore are also loaded to only a substantially smaller fraction than would be possible according to the ideal brake-force distribution Therefore the front-wheel brakes are subjected to a relatively higher load than the rear-wheel brakes, and even in the partial braking range a considerable amount of braking deceleration, which would be attainable with an ideal brake-force distribution, is relinquished.

Figure 6:
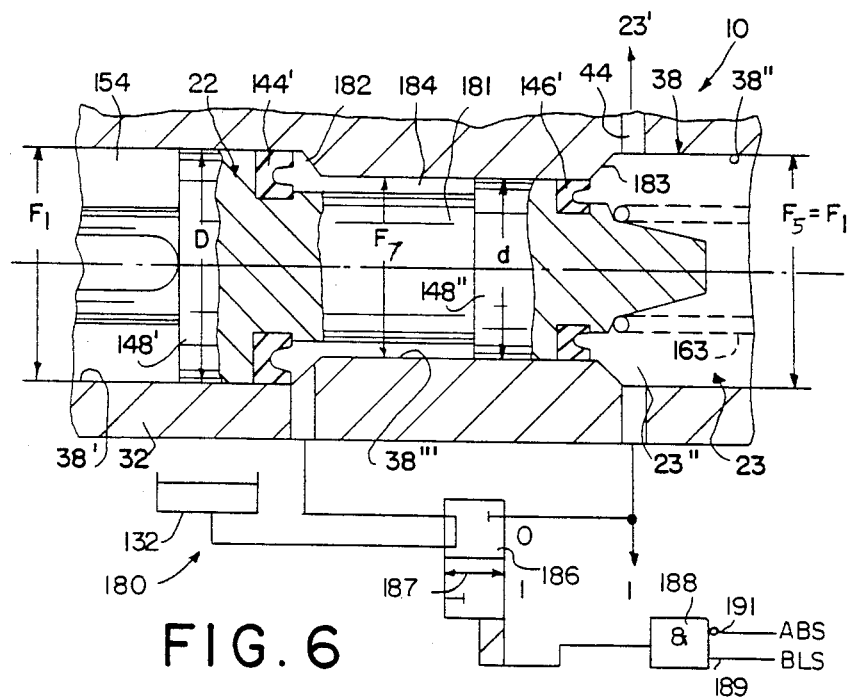
FIG. 6 shows details of the change-over device and of its control unit in a truncated sectional representation along the central axis of the housing bore containing the secondary piston.

To make it possible to utilize higher rear-axle brake-force fractions in the partial braking range for vehicles equipped with an anti-lock system of a design and functioning known per se, there is, a change-over device, 180, the basic construction of which is illustrated in FIG. 6 for the brake units 10, 110 and 210 explained with reference to FIGS. 1 to 4. This anti-locking system for brake unit 10, 110 or 210 can be adjusted in a change-over manner to two different values of a fixed-setting brake-force distribution. One may be represented by the straight line 201 corresponding to a stable braking behaviour and the second by the steeper straight line 204 already intersection the parabola 202 of the ideal brake-force distribution at a point 206 which, in the exemplary embodiment chosen for explanatory purposes, corresponds to a vehicle deceleration of 0.5.

Insofar as elements of a brake unit 10, 110 or 210 which are shown in FIG. 6 are given the same reference symbols as in FIGS. 1 to 4, attention is drawn to their basic constructional identity and/or functional similarity and moreover reference is made to the relevant description parts relating to these figures. This also pertains to those elements of FIG. 6 for which only reference symbols are given, and which are not specifically mentioned in the following description.

Furthermore, for the sake of simplicity, the change-over device 180 will be explained only in respect of the brake unit 10 according to FIG. 1, to which reference will likewise be made insofar as attention is drawn in the following description to elements not shown in FIG. 6.

In the illustrated special exemplary embodiment of the change-over device 180, the secondary piston 22 movably limiting the secondary outlet-pressure space 24 of the brake unit 10 has, on its side facing the part space 23" of the primary outlet-pressure space 23, two piston flanges 148' and 148" of differing diameters D and d. These are arranged at an axial distance from one another and are connected fixedly in one piece to one another by means of a rod-shaped intermediate piece 181. The flange 148' of the larger diameter D has the same diameter as the flange 147 forming the movable axial limitation of the secondary outlet- pressure space 24. The secondary piston 22 is displaceably guided in a pressure-tight manner in that bore portion 38' of corresponding diameter D of the bore space 38 of FIG. 1. Between this bore portion 38' and the bore portion 38", referenced as bore portion space 23" of the primary outlet-pressure space 23 in FIG. 1, there is a middle bore portion 38''' which extends between them and which has a smaller diameter corresponding to the diameter d of the smaller piston flange 148". The two piston flanges 148' and 148" are each sealed off from the respective bore portions 38' and 38''' by means of a annular gaskets 144' and 146' fixed relative to the piston. In the basic position of the secondary piston 22, corresponding to the non-actuated state of a brake unit 10, the piston flanges 148', 148" and their annular gaskets 144', 146' are arranged in the immediate vicinity of the housing steps 182 and 183 which are in the form of annular chamfers and which set off the bore portions 38' and 38''', relative to the bore portion 38''' of smaller diameter d. The axial extent of the middle mbore step 83''', or the axial distance between the two piston flanges 148' and 148" is selected so grant that, within the total pressure-changing stroke of the secondary piston 22 within the middle bore step 38''', the piston flange 148" of smaller diameter remains in contact with bore step 38'''. An annular space 184 extends between the two piston flanges 148' and 148" and, via a brake-force distribution control valve 186, can be connected alternatively to a pressureless brake-fluid reservoir 132 or to the primary outlet-pressure space 23 or its part space 23".

In the illustrated basic position "0" of the brake-force distribution control valve 186, the annular space 184 of the brake unit 10 is shut off from the primary outlet-pressure space 23 of the latter and is connected to the brake-fluid reservoir 132 and thereby relieved of pressure. In this functional position "0" of the brake-force distribution control valve 186, during a braking operation, the force acting on the secondary piston 22 with the effect of a brake-pressure build-up in the secondary outlet-pressure space 24 is given by the relation:

$$K_{sl} = P_{PA} \cdot F_7$$

$P_{PA}$ denoting the pressure prevailing in the primary outlet-pressure space 23 and fed as a brake pressure into the front-axle brake circuit I, and $F_7$ denoting the effective cross-sectional surface of the smaller piston flange 148" which delimits the annular space 148 from the part space 23" of the primary outlet-pressure space 23 of a brake unit 10.

In this functional position "0" of the brake-force distribution control valve 186, the brake unit is set at the "stable" brake-force distribution represented by the straight line 201 in FIG. 5.

In the energized position "I" of the brake-force distribution control valve 186, the annular space 184 is shut off from the brake-fluid reservoir 132, and instead is in communicating connection with the primary outlet-pressure space 23 of the brake unit 10 via a throughflow path 187 of the brake-force distribution valve 186, so that the pressure $P_{PA}$ prevailing in the primary outlet-pressure apace 23 is mow also fed into the annular space 184.

Thus, in the energized position "I" of the brake-force distribution control valve 186 during a braking operation, the force $K_{sl}$ acting on the secondary piston 22 with the effect of a brake-pressure build-up in the secondary outlet-pressure space 24 is given by the relation:

$$K_{sl} = P_{PA} \cdot F_1$$

which is higher by the factor $D^2/d^2$ than the force $K_{sl}$ acting on the secondary piston 22 in the basic position "0" of the brake-force distribution control value 186.

Thus, in the energized position "I" of the brake-force distribution control valve 186, the brake unit is set at a brake-force distribution which makes it possible to utilize a higher rear axle brake-force fraction in the partial braking range and which is represented in FIG. 5 by the straight line 204 corresponding to an "unstable" brake-force distribution.

A simple method of activating the brake-force distribution control valve 186 so as to allow the expedient utilization of the two different brake-force distributions is as follows:

As long as the brake unit is not actuated, the brake-force distribution control valve 186 is in its illustrated basic position "0". When a braking operation starts, it is triggered, for example, by the response of a brake-light switch (not shown) and changed over to its energized position "I", with which the unstable brake-force distribution 204 is linked. If the anti-lock system responds during braking: an output signal characteristic of this and coming from an electronic control unit (not shown) of the anti-lock system causes the activation of the brake-force distribution control valve 186 to be cancelled again, and the latter, as long as the anti-lock system is activated, then returns to its basic position "0" corresponding to the "stable" brake force distribution 201.

A control unit suitable for this method of activating the brake-force distribution valve 186 can, in principle be produced by means of a logical AND element 188 having a non-negated first control input 189, to which the brake-light switch output signal is fed as a control signal, and a negated second control input 191, to which an output signal characteristic of the response of the anti-lock system and belonging to an electronic control unit (not shown) of the anti-lock system is fed.

A further possibility for the control circuit logic of the brake-force distribution control valve 186 is for the valve 186 to be returned to its basic position only when a fault occurs in the anti-lock system.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake unit for a road vehicle with a hydraulic dual-circuit braking system comprising:
- a static front-axle brake circuit and a static rear-axle brake circuit which are respectively connected to a primary outlet-pressure space and a secondary outlet-pressure space of the brake unit;
- brake pressure means for building up and setting a brake pressure value correlated with a brake actuating force applied by a brake pedal activated by the vehicle driver in said primary and secondary outlet pressure spaces including a hydraulic brake booster means comprising a brake valve means generating an outlet pressure which is proportional to a brake pedal force applied by the driver and which is fed into at least one drive pressure space, limited in an axially movable manner by a drive piston of the brake booster;
- said outlet pressure causing displacement of the drive piston;
- at least one axial-force transmission means displaced by displacement of the drive piston for moving a primary-piston means;
- said primary piston means forming a movable side of the primary outlet-pressure space;
- a second piston means delimiting the secondary outlet-pressure space, located in said primary outlet space, and movable as a result of the pressure build-up in the primary outlet pressure space;
- a housing possessing two housing bores parallel to one another;
- the secondary piston means movably delimiting the secondary outlet-pressure space and being displaceably arranged in a pressure-tight manner in one of said housing bores;
- at least one piston element mean of the primary-piston means being displaceably guided in a pressure tight manner in the other of said two housing bores;
- an effective cross-sectional surface of the said piston element means determining a corresponding part cross-section of the primary outlet-pressure space;
- said primary-piston mean comprising a second piston element which, in the event of a failure of said brake booster, remains in a basic position corresponding to a non-actuated state of the brake unit and which is motionally coupled to the brake pedal positively and non-positively;
- wherein, in the event of a failure of the front-axle brake circuit, said piston element means, which is supported axially on the second piston element means, can as a result of its axial displacement build-up brake pressure in the secondary outlet-pressure space, and wherein:
- the primary outlet-pressure space comprises a first part space which is limited movably on one side by a first piston element of the primary-piston arrangement and otherwise fixedly relative to the housing in the first axial bore of the housing;
- a second part space which is in constantly communicating connection with the first part space and which is axially delimited on two sides within the second housing bore by the secondary piston means and two piston elements means of the primary-piston means which are displaceable relative to one another in a pressure-tight manner;
- one of said piston element means is designed as an annular piston sealed off displaceably relative to the second housing bore
- the other of said two piston element means is designed as a plunger piston which is arranged displaceably in a pressure-tight manner in an axial passage bore of the annular piston;
- said at least one axial-force transmission element means is yoke-shaped for making a positive and non-positive motion coupling of the primary piston, limiting the first part space of the primary outlet-pressure space with only one of the two piston element means which delimits the second part space of the primary outlet-pressure space on one side;
- a second axial-force transmission element means for making a positive and non-positive motional coupling of the other piston element means of the primary-piston elements, limiting the second part space with the drive piston of the brake booster; and
- a third axial-force transmission element means, connected with the actuating force exertable by means of the brake pedal for acting directly on the yoke-shaped axial-force transmission element means in the event of a failure of the brake booster.

2. A brake unit according to claim 1, wherein there is a further drive piston means supported on the yoke-shaped axial-force transmission element means and arranged coaxially relative to the first piston element means movably limiting the first part space of the primary outlet-pressure space.

3. Brake unit according to claim 2, wherein the brake valve means of the brake booster means comprises a valve body engaged by the brake pedal via a push rod, guided displaceably in the axial direction on the housing of the brake unit, and integrated into the further drive piston;
- stop means, by which relative movements of the push rod in relation to the drive piston are limited to a value approximately equal to a maximum opening stroke of the brake valve, which itself corresponds to only a small fraction of a brake-pressure build-up stroke of the drive piston and the primary-piston means.

4. A brake unit according to claim 2, wherein in the yoke-shaped axial-force transmission element means is guided displaceably in the axial direction by piston-like guide extensions, in mutually aligned guide bores of the brake-unit housing.

5. A brake unit according to claim 3, wherein in the yoke-shaped axial-force transmission element means is guided displaceably in the axial direction by piston-like guide extensions, in mutually aligned guide bores of the brake-unit housing.

6. A brake unit according to claim 4, wherein the brake-valve housing comprises a block-shaped main cylindrical part and an adjoining block-shaped booster part;
- a parting line between these two parts runs within a leakage-oil space and is in communicating connection with outside atmosphere;
- the yoke-shaped axial-force transmission element means being arranged within this leakage-oil space and being displaceable between positions corresponding to a non-actuated state of the brake unit and an actuating state linked to a maximum brake force.

7. A brake unit according to claims 2 wherein a ratio $F_4/F_5$ of the cross-sectional surface $F_4$ of the primary piston, movably limiting the first part space of the primary outlet-pressure space, to the total cross-sectional surface $F_5$ the primary-piston elements, movably limiting of the second part space of the primary outlet-pressure space is equal to the ratio $F_2/F_3$ of surfaces $F_2$ and $F_3$ of the two drive piston means;

and wherein the two drive piston means are supported axially on the respective primary piston element means via the axial-force transmission element means.

8. Brake unit according to claim 3 wherein two housing bores are made in a block-shaped master-cylinder part in a symmetric arrangement relative to a central longitudinal axis of the first part space of the first primary outlet-pressure space;

said two housing bores defining two secondary outlet-pressure part spaces and two primary outlet-pressure part spaces in a tandem arrangement respectively by means of two floating pistons and two primary-piston element means in the form of annular pistons and two other plunger pistons, respectively;

the secondary outlet-pressure part spaces being in communicating connection with one another;

two other part spaces of the primary outlet-pressure space being connected to the two first part spaces by a centrally arranged piston;

and wherein the axial actuating force of the push rod motionally coupled with the brake pedal acts centrally, via the symmetrically designed yoke-shaped axial-force transmission element means, on the centrally arranged piston and, via radial supporting arms, respectively at least on one of the two symmetrically arranged primary-piston elements.

9. Brake unit according to claim 2, wherein the actuating force of the brake pedal engages along a common central longitudinal axis extending between the central longitudinal axes of the housing bores and parallel to these; and wherein said common central longitudinal axis supports guide extension means for the yoke-shaped axial-force transmission element means.

10. Brake unit according to claim 8, wherein, there is a third drive piston which is coaxial relative to the central longitudinal axis in the direction of the actuating force exertable by the brake pedal; and wherein said third piston contains the brake valve of the brake booster and engages the yoke-shaped axial-force transmission element means via a booster-facing guide extension.

11. Brake unit according to claim 1 wherein, a radial supporting arm of the yoke-shaped axial-force transmission element means is fixedly connected to on the plunger piston on one side thereof; and wherein the annular piston is supported directly on the drive piston of the brake booster via a tappet-shaped axial-force transmission element extending laterally past the supporting arm.

12. Brake unit according to claim 1, wherein the yoke-shaped axial-force transmission element engages a radial supporting arm on the annular piston means of the primary-piston arrangement means on one side, and wherein the plunger piston of this primary-piston arrangement means is motionally fixedly coupled in terms of displacement to the drive piston by passing axially through a bore on the supporting arm of the yoke-shaped axial-force transmission element means.

13. Brake unit according to claim 11, wherein during a basic position of the axial-force transmission element means of the brake unit corresponding to a non-actuated state of the brake unit, a free end of the plunger piston, which is located on the same side as the second part space and which is supported on the secondary piston in the event of a joint failure of the brake booster and of the front-axle brake circuit, is arranged at a greater axial distance from a piston flange of the secondary piston means, facing the primary outlet-pressure space, than an end extension of the primary-piston arrangement means which points towards the said secondary piston and belonging to the annular piston means.

14. Brake unit according to claim 12, wherein during a basic position of the axial-force transmission element means of the brake unit corresponding to a non-actuated state of the brake unit, the free end of the plunger piston which is located on the same side as the second part space, and which is supported on the secondary piston in the event of a failure of the front-axle brake circuit, is arranged at a smaller axial distance from the secondary piston than an end extension of the primary piston arrangement means which points towards the said secondary piston and which can be supported on the secondary piston in the event of a failure of the brake booster.

15. A brake unit according to claim 1 wherein, there is a change-over means, for adjusting brake distribution forces from a first value ensuring a high dynamic stability of the vehicle to a second value at which a rear-axle brake-force fraction is higher.

16. Brake unit according to claim 15, wherein said vehicle is also equipped with an anti-lock means and wherein when the brake pedal is actuated, the change-over means causes a change over to the second value of the installed brake-force distribution corresponding to the higher rear-axle brake-force and, when the anti-lock control responds, causes a change back to the brake force distribution value corresponding to the higher dynamic stability.

17. Brake unit according to claim 16, wherein upon a failure of the anti-lock system means, the change-over means changes back to the value of the front-axle/rear-axle brake-force distribution corresponding to the higher dynamic stability.

18. Brake unit according to claims 15, wherein the secondary housing bore, in which the secondary piston means and the annular piston means of the primary-piston arrangement means are guided displaceably in a pressure-tight manner, is provided between a first bore portion having a first radial limitation fixed relative to the housing of the secondary outlet-pressure space and a second bore portion forming a second radial limitation, fixed relative to the housing, and connected to the second part space of the primary outlet-pressure space arranged coaxially to the secondary outlet-pressure space;

a middle portion of said secondary housing bore having a diameter which is smaller than a diameter D of the first bore portion and also smaller than the diameter of the secondary bore portion which houses the primary-piston arrangement means;

the secondary piston means being equipped with a flange which is guided displaceably in a pressure-tight manner in said middle bore portion to ensure a pressure-tight delimitation of the primary outlet-pressure space relative to the middle bore portion;

said piston flange and another piston flange on said secondary piston means defining an annular space extending between these piston flanges;

said change-over means including a brake-force distribution solenoid control valve which in a basic position shuts off said annular space from the primary outlet-pressure space and connects said annular space with a brake-fluid reservoir, and wherein when the distribution solenoid control valve is moved to an energized position the annular space is shut off from the brake-fluid reservoir and is in communicating connection with the primary outlet-pressure space of the brake unit;

an electronic control unit means which controls movement of said distribution solenoid control valve so as to move it into its energized position when and as long as the brake unit is actuated and the anti-lock system of the vehicle has not responded.

19. Brake unit according to claims 16, wherein the secondary housing bore, in which the secondary piston means and the annular piston means of the primary-piston arrangement means are guided displaceably in a pressure-tight manner, is provided between a first bore portion having a first radial limitation fixed relative to the housing of the secondary outlet-pressure space and a second bore portion forming a second radial limitation, fixed relative to the housing, and connected to the second part space of the primary outlet-pressure space arranged coaxially to the secondary outlet-pressure space;

a middle portion of said secondary housing bore having a diameter which is smaller than a diameter D of the first bore portion and also smaller than the diameter of the secondary bore portion which houses the primary-piston arrangement means;

the secondary piston means being equipped with a flange which is guided displaceably in a pressure-tight manner in said middle bore portion to ensure a pressure-tight delimitation of the primary outlet-pressure space relative to the middle bore portion;

said piston flange and another piston flange on said secondary piston means defining an annular space extending between these piston flanges;

said change-over means including a brake-force distribution solenoid control valve which in a basic position shuts off said annular space from the primary outlet-pressure space and connects said annular space with a brake-fluid reservoir, and wherein when the distribution solenoid control valve is moved to an energized position the annular space is shut off from the brake-fluid reservoir and is in communicating connection with the primary outlet-pressure space of the brake unit;

an electronic control unit means which controls movement of said distribution solenoid control valve so as to move it into its energized position when and as long as the brake unit is actuated and the anti-lock system of the vehicle has not responded.

20. Brake unit according to claims 17, wherein the secondary housing bore, in which the secondary piston means and the annular piston means of the primary-piston arrangement means are guided displaceably in a pressure-tight manner, is provided between a first bore portion having a first radial limitation fixed relative to the housing of the secondary outlet-pressure space and a second bore portion forming a second radial limitation, fixed relative to the housing, and connected to the second part space of the primary outlet-pressure space arranged coaxially to the secondary outlet-pressure space;

a middle portion of said secondary housing bore having a diameter which is smaller than a diameter D of the first bore portion and also smaller than the diameter of the secondary bore portion which houses the primary-piston arrangement means;

the secondary piston means being equipped with a flange which is guided displaceably in a pressure-tight manner in said middle bore portion to ensure a pressure-tight delimitation of the primary outlet-pressure space relative to the middle bore portion;

said piston flange and another piston flange on said secondary piston means defining an annular space extending between these piston flanges;

said change-over means including a brake-force distribution solenoid control valve which in a basic position shuts off said annular space from the primary outlet-pressure space and connects said annular space with a brake-fluid reservoir, and wherein when the distribution solenoid control valve is moved to an energized position the annular space is shut off from the brake-fluid reservoir and is in communicating connection with the primary outlet-pressure space of the brake unit;

an electronic control unit means which controls movement of said distribution solenoid control valve so as to move it into its energized position.

* * * * *